Nov. 19, 1940.  F. HAUG ET AL  2,221,837

TURNTABLE FOR CONVEYER ASSEMBLIES

Filed March 15, 1939

INVENTORS
FRIEDRICH HAUG
PAUL BAUR
BY
ATTORNEY

Patented Nov. 19, 1940

2,221,837

UNITED STATES PATENT OFFICE 2,221,837

TURNTABLE FOR CONVEYER ASSEMBLIES

Friedrich Haug, Stuttgart Zuffenhausen, and Paul Baur, Stuttgart-Bad Cannstatt, Germany, assignors to Baker Perkins Company, Inc., Saginaw, Mich., a corporation of New York Application March 15, 1939, Serial No. 261,876
In Germany March 16, 1938

3 Claims. (Cl. 198—25)

This invention relates to belt or band conveyer assemblies as employed in biscuit plants and the like, and has for its object the provision of a simplified and improved turntable for transferring goods received from one conveyer onto a second conveyer angularly related thereto, changing their direction of travel. It is particularly applicable, for example, to the conveyer systems of biscuit baking plants in which goods are transferred from an endless oven conveyer to one or more cooling conveyers in series on which they are carried for a time to permit their reaching a temperature suitable for packaging. In plants of this kind, since the stacking and packing of biscuits is done automatically, it is desirable that the original alinement and spacing of the biscuits on the oven conveyer be maintained throughout their travel to the packing station.

Because of considerations of floor space in plants of this kind it is necessary to employ turntable mechanisms between each two successive linear band conveyers, to receive the goods, carry them through arcs up to 180 degrees, and transfer them onto a second conveyer. The turntables hitherto used have had certain disadvantages and have been comparatively expensive to build and maintain. They have consisted generally of annular or disk-shaped fabric webs or endless metal belts doubled or folded over rollers or knife edges so that they presented an upper working run to carry the goods and a lower inverted return run.

An early form of turntable consisted of a fabric disk fastened to a hub at its center running over a table and folded over a knife edge substantially at its diameter. This canvas web was driven and held taut by power-driven friction rollers around its periphery. These rollers both wore the fabric rapidly and stretched it circumferentially so that it soon became wavy and presented wrinkles. If kept in service too long it would slip from beneath the driving rollers and stop the flow of articles while the feeding conveyer would of course continue to deposit goods upon it. In confection plants particularly, partly solidified chocolates would oftentimes be piled upon a turntable which had thus ceased to run, resulting in the spoilage of a great deal of material before the stoppage was discovered, since in these plants the conveyers and turntable are concealed within a cooling tunnel. The spoilage and loss of time required for cleaning of the machine was exceedingly costly.

Woven wire turntables for this purpose require the provision of complicated curvilinear chain drives and guides around their peripheries, so that both the first cost and maintenance expense of turntables of this kind are relatively great as compared with the simple mechanism provided by our invention. The foregoing remarks apply also to arcuate transfer conveyers consisting of sector-shaped blades or panels which must be movably connected together and to a driving mechanism.

Furthermore, both the conveyer surfaces and their supporting and driving mechanisms of the foregoing kinds must be constructed especially for each given degree of arcuate travel—for example, an endless fabric conveyer for a 90 degree transfer must be woven in the form of a cone, whereas for 180 degrees it must be woven in the form of a flat ring or disk. Similarly, the associated conveyer frame and driving elements have to be especially built for each conveyer of differing arcuate travel.

The object of our invention is therefore to provide a conveyer or turntable free from the foregoing disadvantages, which shall be simple, inexpensive, and usable without change for a transfer of goods through any desired arc, that is, between two belt conveyers at any desired angle to each other up to 180 degrees.

A further object is to provide a turntable that shall be more economical in use, that is more durable, and can be more easily cleaned and maintained than those heretofore available.

The invention by which we accomplish these purposes consists broadly in the provision of a turntable in the form of a disk-like or annular turntable, the upper face of which receives biscuits or other articles from one linear conveyer, and from which the articles are transferred to a second conveyer running at any desired angle to said first conveyer. It is an essential feature of the invention that the surface of the turntable be so made that either the second conveyer surface itself or inclined biscuit receiving means in advance of the second conveyer may project below the normal plane of the turntable surface upon which the biscuits or other articles are carried. Thus the biscuits carried upon and propelled by the turntable surface encounter only an inclined surface up which they are pushed or carried at their point of removal from the transfer surface, and are not checked and displaced from their relative positions on the moving turntable by striking the edge of a scraper or conveyer nosing.

A further specific feature of the invention consists of the provision of novel transfer means at the point of removal of the articles from the turntable, which permits the receiving conveyer to run over a knife edge or roller of substantial diameter, whereby excessive flexing of the belt conveyer may be avoided, and whereby also, if desired, friction between the under surface of said conveyer and the turntable may be eliminated.

Further features and advantages of the invention will be apparent in the course of the following description, which describes two specific embodiments of it. These embodiments are illustrated diagrammatically in the accompanying drawing, in which—

Figure 1:
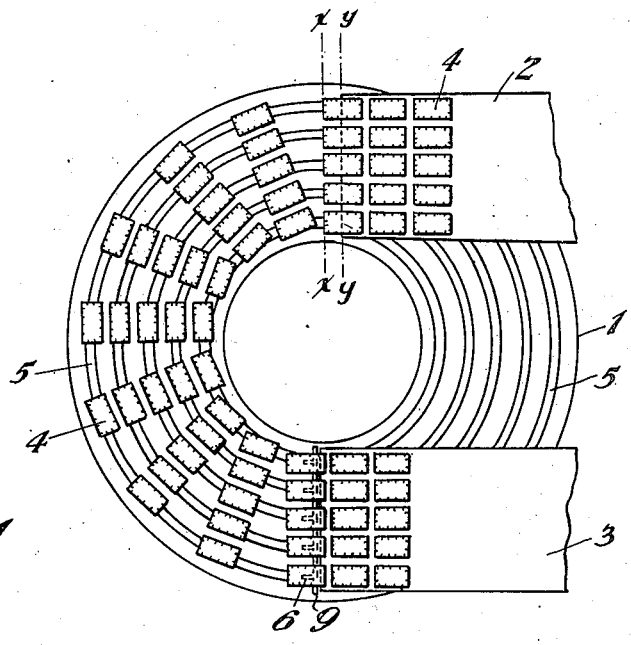
Fig. 1 is a top plan view of a turntable assembly according to the invention.

Fig. 1 shows diagrammatically a turntable 1 driven counter-clockwise by means not shown, in timed relation to conveyers 2 and 3, which are 180 degrees apart. Biscuits 4 are delivered from conveyer 2, which may be a baking conveyer or a cooling conveyer, onto turntable 1, which carries them through an arc of 180 degrees and delivers them onto conveyer 3 traveling oppositely to conveyer 2. Conveyers 2 and 3 are arranged tangentially to the turntable 1 and their ends are preferably arranged parallel to radii thereof, as will be described later, so that alined and accurately positioned goods, as biscuits 4, will be deposited in predetermined relationship upon the surface of the turntable and will be transferred onto the conveyer 3 in the same relative position and alinement that they occupied on conveyer 2. The nosings or ends of conveyers 2 and 3 may of course be disposed angularly to correspondingly located radii, and articles on conveyer 3 will have the same relative positions as on conveyer 2, provided the angular relationships of the conveyer ends to adjacent radii of the turntable be the same.

It is apparent that scraping means, or the blunt ends formed by conveyers 2 and 3 as they pass around the nosings, could not pick up biscuits from the turntable without liability of disarranging them, should such scraping means or conveyer ends rest upon and above the turntable surface, as in the apparatus heretofore employed. A novel surface construction and co-operative biscuit-removing means is, however, provided by this invention whereby the goods may be removed from the upper surface of the turntable 1 without disarranging them, instead of having to be dropped therefrom onto the receiving conveyer surface by turning the turntable surface over a knife edge or nosing roll as in the prior art.

Figure 2:
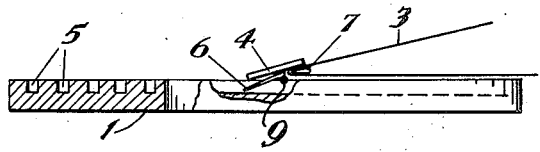
Fig. 2 is a side elevation partly in section of the turntable assembly shown in Fig. 1.

One embodiment of this new turntable appears in Figs. 1 and 2. The surface of Fig. 1 is provided with concentric endless grooves 5 spaced together at least as closely as the distance between centers of the articles 4, taken transversely of their direction of travel. Fingers or tines 6 are provided which present each an inclined upper face extending into each groove 5 below the upper surface of the turntable 1, while their upper extremities extend above the surface and lie in substantial alinement with the working face of the receiving conveyer 3. The fingers are carried by a cross-rod 9, which is suitably supported above the turntable surface by frame members, not shown. The over-all length of the fingers or tines 6 may vary, but their length between the normal surface of disk 1 and the surface of conveyer 3 where it passes over the nosing or knife edge 7 must be less than the greatest length of the articles 4, so that as the articles are pushed by the turntable onto the inclined surfaces 6 they will span surfaces 6 and engage the moving surface of conveyer 3 before they leave the surface of disk 1 and its propulsive effect.

In the apparatus shown knife edges or nosings 7, over which conveyers 2 and 3 change their direction, are located so that as the biscuits drop from conveyer 2 or engage conveyer 3 they shall be deposited upon or removed from turntable 1 along a radius $x$—$x$ of the disk. This is accomplished, for example, by offsetting the discharge end $y$—$y$ of conveyer 2 from the radius $x$—$x$ of the disk a distance somewhat less than the greatest length of the biscuits 4. Thus the front end of each biscuit discharged from conveyer 2 will first engage the disk 1 along a radius thereof, and the original longitudinal alinement of the biscuits will be preserved.

To accommodate biscuits of various lengths means is provided to adjust the front edge $y$, $y$ of conveyer 2 in parallel relationship to and from radius $x$—$x$. A similar adjustment provided for the positioning of the knife edge 7 of conveyer 3 relative to the parallel radius of the disk 1, is illustrated diagrammatically in Fig. 2.

In operation, the biscuits 4 on conveyer 2 are carried over the lapped end of the conveyer. The front edges of the transversely alined biscuits 4 engage the surface of the disk 1 simultaneously, and they are carried thereon around to conveyer 3, their relative transverse positioning being maintained. At the take-off point they engage the inclined fingers 6 and are pushed upward over them by the action of turntable 1, their forward edges engaging the surface of conveyer 3 before the rearward edges have left the turntable 1. The biscuits of each row are thus simultaneously transferred from the turntable 1 onto the conveyer 3 in the transverse alinement and relative position that they originally had upon conveyer 2.

Figure 3:
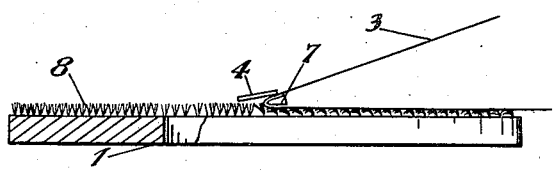
Fig. 3 is a side elevation similar to Fig. 2, showing an alternative application of the invention to turntable and conveyer assemblies.

A modified embodiment of the general mechanism of Figs. 1 and 2 is shown in Fig. 3. The turntable 1, instead of having concentric grooves into which fingers 6 extend below the normal biscuit-carrying surface, has a surface consisting of pile fabric or upstanding flexible bristles 8. In the embodiment shown, the knife edge 7 of conveyer 3 is positioned below the plane defined by the ends of the pile or bristles so that the upper face of the conveyer at its turning point lies slightly below the bottom of the biscuits on the turntable.

The operation of the assembly is identical with that of Figs. 1 and 2, that is, the biscuit receiving surface 3 is pressed into the pile below the normal article-supporting plane so that biscuits encountering the conveyer 3 are not checked or tripped and thereby disturbed in their alinement radially of the turntable.

If desired, the nosing 7 and the take-off conveyer 3 may be positioned higher than they are shown in Fig. 3, so that the return lap of conveyer 3 does not run in contact with the surface of the turntable.

Figure 4:
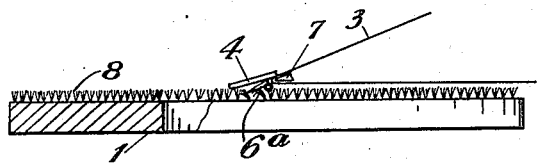
Fig. 4 shows a modification of the assembly of Fig. 3.
Figure 5:
Fig. 5 is a top plan view of the biscuit-lifting ramp in Fig. 4.

In Fig. 4 an inclined ramp 6a corresponding in proportion and function to fingers 6 is positioned ahead of the nosing and extending parallel thereto radially of the turntable. It may be straight-edged, or serrated to present fingers as shown in Fig. 5, its forward edge in either case bearing into the bristles or pile 8 of the turntable below the plane of the biscuits. The operation of this member is the same as that of the fingers 6 in Figs. 1 and 2, namely, to lift the biscuits under the urging of the turntable and lead them onto the leading edge of conveyer 3, where it passes over the nosing. The provision of such a ramp permits the use of a nosing of relatively large diameter to reverse the direction of conveyer 3.

In depositing biscuits or articles upon the turntable as shown in all of the figures the biscuits may be discharged directly over the nosing of conveyer 2 by gravity onto the turntable with no risk of disturbing their alinement, so long as the drop from the conveyer 2 onto the turntable is not great enough to tip them over or permit them to roll.

It is evident that one turntable may be used to transfer biscuits between two conveyers, as 2 and 3, regardless of the angle at which such conveyers may be disposed to one another. It is essential only that the conveyers at their knife edges be disposed relative to their corresponding radii of the turntable in the same angular relationship so that any two or more articles in alinement transversely of one belt will be picked up from the turntable to lie transversely alined on the receiving conveyer. In other words, they should have the same relative positioning on the second conveyer as on the first.

While we have shown and described two specific embodiments of the invention, minor changes or modifications may be made therein within the spirit of the invention and the scope of the appended claims. For example, in turntables as in Figs. 3 and 4 yieldable surfaces of materials other than pile fabric or bristles may be employed, such as soft sponge rubber.

Having thus described our invention, what we claim and desire to secure by Letters Patent is:

1. In combination with two linear conveyers in series angularly related to each other in their direction of travel, intermediate transfer conveyer means for carrying articles through an arcuate path from one to the other comprising a turntable rotating beneath the ends of both linear conveyers and having article-supporting means in a plane above its body, and inclined means associated with the receiving conveyer to guide or carry articles upward from said turntable, said inclined means extending downward below said article-supporting means and the bottoms of articles carried thereon.

2. Apparatus as claimed in claim 1, wherein the surface of the turntable is provided with a plurality of spaced concentric grooves, and wherein the inclined guiding means consist of fingers extending downward into said grooves below the bottoms of the articles and upward from the plane of said bottoms to the surface of said receiving conveyer a linear distance less than the length of the articles to be handled, taken in their direction of travel.

3. A structure as claimed in claim 1, wherein the surface of the turntable consists of vertically yieldable resilient material, and the inclined receiving means is pressed downward into said surface so that it extends below the bottoms of articles on said surface.

FRIEDRICH HAUG.
PAUL BAUR.